US009719405B2

(12) United States Patent
Nakajima et al.

(10) Patent No.: US 9,719,405 B2
(45) Date of Patent: Aug. 1, 2017

(54) INTERNAL COMBUSTION ENGINE AND STRADDLE-TYPE VEHICLE EQUIPPED WITH THE ENGINE

(75) Inventors: Akitoshi Nakajima, Shizuoka (JP); Toshinori Inomori, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 302 days.

(21) Appl. No.: 13/552,669

(22) Filed: Jul. 19, 2012

(65) Prior Publication Data

US 2013/0019656 A1 Jan. 24, 2013

(30) Foreign Application Priority Data

Jul. 20, 2011 (JP) ................................. 2011-158623

(51) Int. Cl.

| | |
|---|---|
| ***G01L 23/22*** | (2006.01) |
| ***F01P 1/06*** | (2006.01) |
| ***F02F 1/06*** | (2006.01) |
| ***F02F 1/30*** | (2006.01) |
| ***F02B 61/02*** | (2006.01) |
| ***F02B 77/08*** | (2006.01) |
| *F02B 75/16* | (2006.01) |

(52) U.S. Cl.

CPC ................ *F01P 1/06* (2013.01); *F02B 61/02* (2013.01); *F02B 77/085* (2013.01); *F02F 1/065* (2013.01); *F02F 1/30* (2013.01); *F02B 75/16* (2013.01)

(58) Field of Classification Search

USPC ........... 73/35.01, 439, 114.01; 123/198, 195, 123/41.69

See application file for complete search history.

(56) References Cited

U.S. PATENT DOCUMENTS

| | | | |
|---|---|---|---|
| 2,275,675 A * | 3/1942 | Draper et al. | 73/35.09 |
| 4,463,800 A * | 8/1984 | Hadden | 165/11.1 |
| 4,468,950 A * | 9/1984 | Ishigami et al. | 73/35.09 |
| 4,475,508 A * | 10/1984 | Okada | 123/41.72 |

(Continued)

FOREIGN PATENT DOCUMENTS

| | | |
|---|---|---|
| CN | 1542425 A | 11/2004 |
| CN | 1605735 A | 4/2005 |

(Continued)

OTHER PUBLICATIONS

JP_2007024006_english translation.*

(Continued)

*Primary Examiner* — Paul West
*Assistant Examiner* — Xin Zhong
(74) *Attorney, Agent, or Firm* — Keating and Bennett, LLP

(57) ABSTRACT

A single-cylinder internal combustion engine includes a knock sensor mounted thereto to suppress a temperature increase of the knock sensor and at the same time detect knocking with high accuracy. The engine includes a cylinder block having a cylinder provided therein, and a cylinder head connected to the cylinder block. On a surface of the cylinder block and the cylinder head, one or more fins protruding from the surface are provided. On the surface of the cylinder block, a sensor mounting boss protruding from the surface and being continuous with a portion of the one or more fins is provided. A knock sensor arranged to detect knocking is mounted to the sensor mounting boss.

15 Claims, 9 Drawing Sheets

(56) References Cited

U.S. PATENT DOCUMENTS

| | | | | | |
|---|---|---|---|---|---|
| 4,517,945 | A * | 5/1985 | Ishigami et al. | 123/193.2 | |
| 4,779,588 | A * | 10/1988 | Ziegler et al. | 123/41.61 | |
| 4,903,646 | A * | 2/1990 | Minagawa et al. | 123/54.7 | |
| 4,944,179 | A * | 7/1990 | Komurasaki | 73/35.11 | |
| 5,230,238 | A * | 7/1993 | Takeuchi | 73/35.11 | |
| 5,715,794 | A * | 2/1998 | Nakamura | F02D 21/08 | 123/305 |
| 2002/0023486 | A1* | 2/2002 | Watanabe et al. | 73/202.5 | |
| 2005/0076860 | A1* | 4/2005 | Tomita | 123/41.74 | |
| 2007/0017282 | A1* | 1/2007 | Tooyama et al. | 73/118.1 | |
| 2008/0295577 | A1* | 12/2008 | Maehara | F01L 1/143 | 73/35.01 |
| 2013/0019657 | A1* | 1/2013 | Nakajima et al. | 73/35.01 | |
| 2013/0019667 | A1* | 1/2013 | Nakajima et al. | 73/114.07 | |

FOREIGN PATENT DOCUMENTS

| | | | |
|---|---|---|---|
| CN | 1991147 | A | 7/2007 |
| DE | 3616636 | A1 | 11/1987 |
| EP | 1 522 705 | A2 | 4/2005 |
| JP | 58-73824 | A | 5/1983 |
| JP | 61-117418 | A | 6/1986 |
| JP | 2004-301106 | A | 10/2004 |
| JP | 2007-32278 | A | 2/2007 |
| JP | 2007024006 | A * | 2/2007 |
| TW | 200424427 | A | 11/2004 |

OTHER PUBLICATIONS

CTC Vibration analysis hardware product manual, Apr. 11, 2008.*

Official Communication issued in corresponding European Patent Application No. 12176484.9, mailed on Apr. 4, 2013.

Nakajima et al.; "Internal Combustion Engine and Straddle-Type Vehicle Equipped With the Engine"; U.S. Appl. No. 13/552,670, filed Jul. 19, 2012.

Nakajima et al.; "Internal Combustion Engine and Straddle-Type Vehicle Equipped With the Engine"; U.S. Appl. No. 13/552,671, filed Jul. 19, 2012.

Nakajima et al.; "Internal Combustion Engine and Straddle-Type Vehicle Equipped With the Engine"; U.S. Appl. No. 13/552,672, filed Jul. 19, 2012.

Official Communication issued in corresponding Taiwanese Patent Application No. 101126090, mailed on May 11, 2015.

* cited by examiner

INTERNAL COMBUSTION ENGINE AND STRADDLE-TYPE VEHICLE EQUIPPED WITH THE ENGINE

BACKGROUND OF THE INVENTION

1. Field of the Invention

The present invention relates to an internal combustion engine fitted with a sensor arranged to detect knocking. The present invention also relates to a straddle-type vehicle equipped with the engine.

2. Description of the Related Art

An internal combustion engine can cause knocking in some cases depending on its operating conditions. Knocking should be avoided as much as possible because it results in, for example, unusual noise and performance degradation of the internal combustion engine. Conventionally, it is known that a sensor to detect knocking, that is, a knock sensor, is fitted to an internal combustion engine. It is also known that, upon detecting knocking by the knock sensor, an action such as changing ignition timing is taken.

In order to detect knocking with high accuracy, it is preferable to dispose the knock sensor at a position near the location at which knocking occurs. JP 2004-301106 A discloses a water-cooled engine in which a knock sensor is fitted to a cylinder block.

A water-cooled engine needs a flow passage for coolant, i.e., a water jacket, to be formed in, for example, a cylinder block and a cylinder head. It also requires, for example, a pump for conveying the coolant and a radiator for cooling the coolant. For this reason, the structure of the water-cooled engine tends to be complicated.

A straddle-type vehicle equipped with a single-cylinder internal combustion engine (hereinafter referred to as a "single-cylinder engine") is known, such as a relatively small-sized motorcycle. The single-cylinder engine has the advantage that it has a simpler structure than a multi-cylinder engine. To fully exploit the advantage, the single-cylinder engine has a relatively simple cooling structure. For that reason, conventionally, fins are provided on the cylinder block or the cylinder head so that at least a portion of the cylinder block or the cylinder head can be cooled by air.

In the air-cooled engine provided with fins, the cylinder block and so forth are cooled from the surface. On the contrary, in the water-cooled engine, the cylinder block and so forth are cooled from a water jacket disposed inside the surface. The knock sensor is disposed on a boss provided on the surface of the engine. This means that, when the boss is provided for the air-cooled engine provided with fins, engine cooling becomes insufficient, and consequently, cooling of the knock sensor may become insufficient. In other words, when the above-described conventional technique, in which it is assumed that cooling is done from the inside of the surface of the engine, is applied to the air-cooled engine, the temperature of the knock sensor may become too high, degrading the reliability of the knock sensor. In contrast, if the knock sensor is disposed at a location far from the location at which knocking occurs in order to dispose the knock sensor at a location at which the temperature is as low as possible, it will be difficult to detect knocking with high accuracy.

SUMMARY OF THE INVENTION

In view of the problems described above, preferred embodiments of the present invention make it possible to detect knocking with high accuracy in a single-cylinder internal combustion engine fitted with a knock sensor while suppressing and preventing a temperature increase of the knock sensor.

An internal combustion engine according to a preferred embodiment of the present invention is preferably a single-cylinder internal combustion engine for a vehicle including: a cylinder block including a cylinder provided therein; a cylinder head connected to the cylinder block; one or more fins protruding from a surface of at least one of the cylinder block and the cylinder head; a sensor mounting boss protruding from the surface and being continuous with a portion of the one or more fins; and a sensor arranged to detect knocking mounted to the sensor mounting boss.

Preferred embodiments of the present invention make it possible to detect knocking with high accuracy in a single-cylinder internal combustion engine fitted with a knock sensor while suppressing and preventing a temperature increase of the knock sensor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
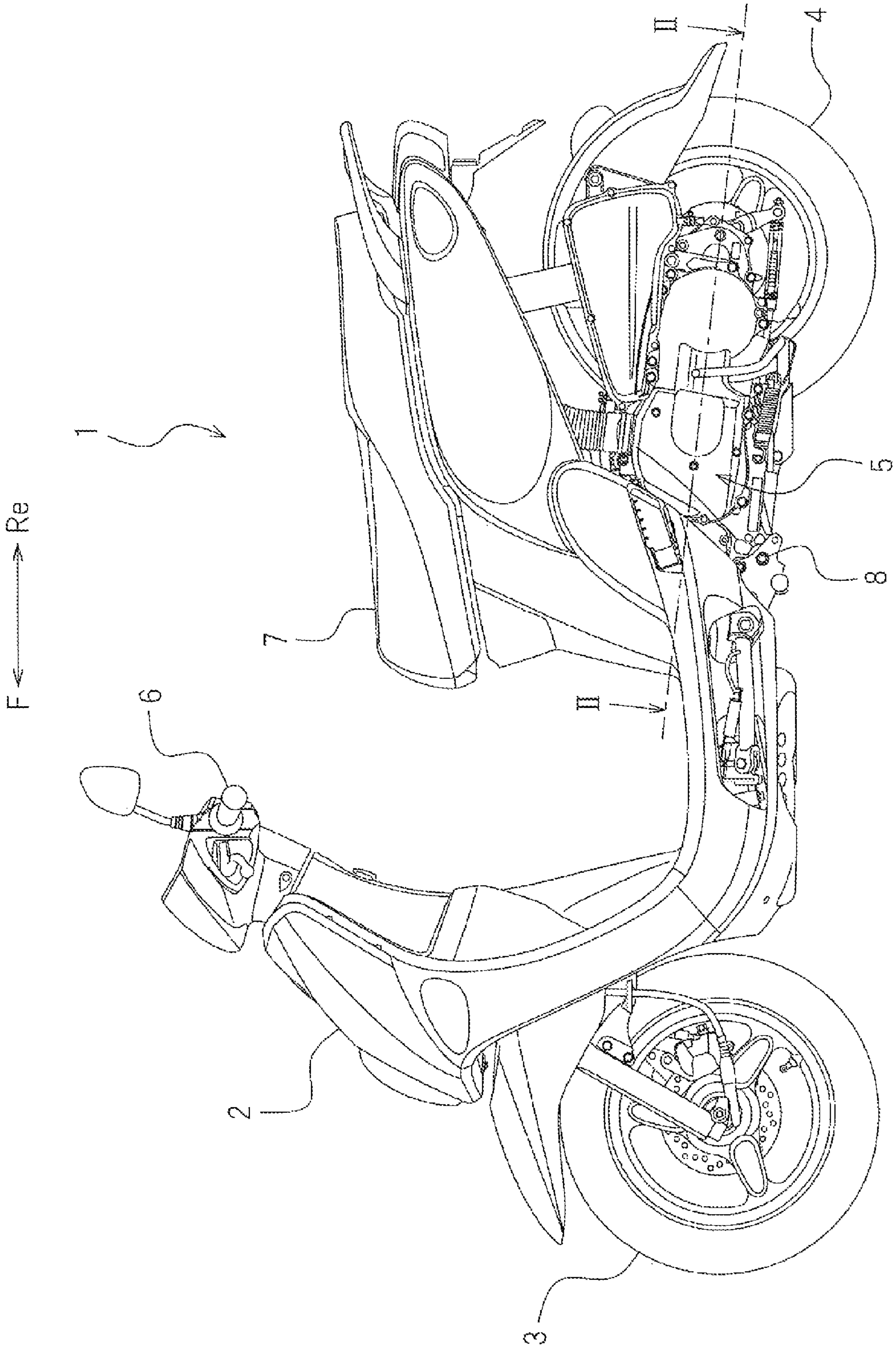
FIG. 1 is a left side view of a motorcycle according to a first preferred embodiment of the present invention.

As illustrated in FIG. 1, a straddle-type vehicle according to a first preferred embodiment is preferably a scooter type motorcycle 1, for example. Although the motorcycle 1 is one example of a straddle-type vehicle according to a preferred embodiment of the present invention, the straddle-type vehicle is not limited to the scooter type motorcycle 1. The straddle-type vehicle may be any other type of motorcycle, such as a moped type motorcycle, an off-road type motorcycle, or an on-road type motorcycle, for example. In addition, the straddle-type vehicle is intended to mean any type of vehicle on which a rider straddles the vehicle, and it is not limited to a two-wheeled vehicle. The straddle-type vehicle may be, for example, a three-wheeled vehicle that changes its traveling direction by leaning the vehicle body. The straddle-type vehicle may be other types of straddle-type vehicle such as an ATV (All Terrain Vehicle), for example.

In the following description, the terms "front," "rear," "left," and "right" respectively refer to front, rear, left, and right based on the perspective of the rider of the motorcycle 1. Reference characters F, Re, L, and R in the drawings indicate front, rear, left, and right, respectively.

The motorcycle 1 includes a vehicle body 2, a front wheel 3, a rear wheel 4, and an engine unit 5 to drive the rear wheel 4. The vehicle body 2 includes a handlebar 6, which is operated by the rider, and a seat 7, on which the rider is to be seated. The engine unit 5 is what is called a unit swing type engine unit, and it is supported by a body frame, not shown in the drawings, so that it can pivot about a pivot shaft 8. The engine unit is supported so as to be swingable relative to the body frame.

Figure 2:
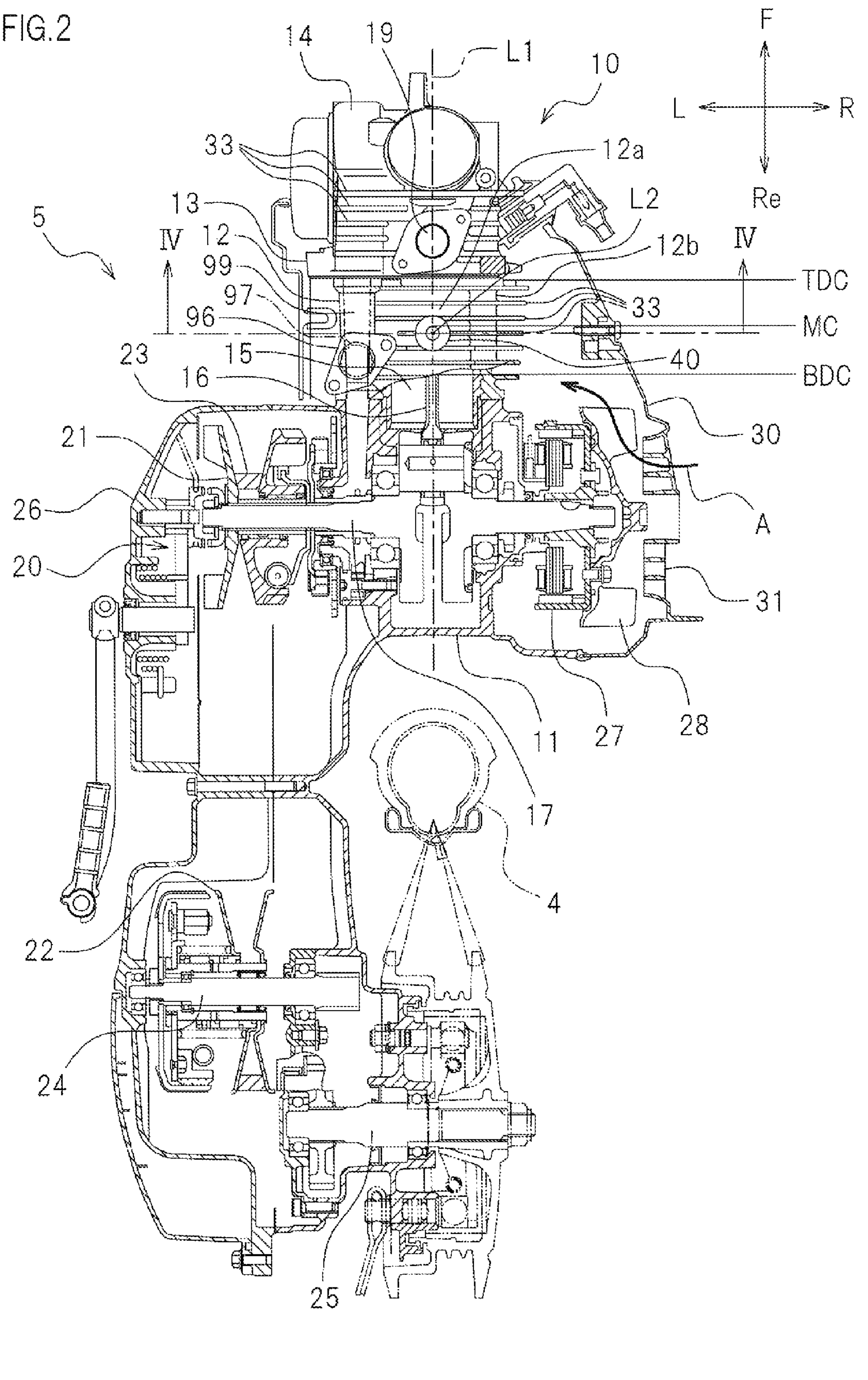
FIG. 2 is a cross-sectional view taken along line II-II of FIG. 1.

FIG. 2 is a cross-sectional view taken along line II-II of FIG. 1. As illustrated in FIG. 2, the engine unit 5 includes an engine 10, which is one example of the internal combustion engine according to a preferred embodiment of the present invention, and a V-belt type continuously variable transmission (hereinafter referred to as "CVT") 20. The CVT 20 is one example of a transmission. In the present preferred embodiment, the engine 10 and the CVT 20 integrally form the engine unit 5, but it is of course possible that the engine 10 and a transmission may be separated from each other.

The engine 10 is preferably an engine that includes a single cylinder, in other words, a single-cylinder engine, for example. The engine 10 is preferably a four-stroke engine, which repeats an intake stroke, a compression stroke, a combustion stroke, and an exhaust stroke, one after another, for example. The engine 10 includes a crankcase 11, a cylinder block 12 extending frontward from the crankcase 11, a cylinder head 13 connected to a front portion of the cylinder block 12, and a cylinder head cover 14 connected to a front portion of the cylinder head 13. A cylinder 15 is provided inside the cylinder block 12.

The cylinder 15 may be defined by a cylinder liner inserted in the body of the cylinder block 12 (i.e., in the portion of the cylinder block 12 other than the cylinder 15) or may be integrated with the body of the cylinder block 12. In other words, the cylinder 15 may be either separate from or integral with the body of the cylinder block 12. A piston, not shown in the drawings, is slidably accommodated in the cylinder 15.

The cylinder head 13 covers a front portion of the cylinder 15. A recessed portion, not shown in the drawings, and an intake port and an exhaust port, also not shown in the drawings, that are connected to the recessed portion are provided in the cylinder head 13. The top surface of the piston, the inner circumferential surface of the cylinder 15, and the recessed portion together define a combustion chamber. The piston is coupled to a crankshaft 17 via a connecting rod 16. The crank shaft 17 extends leftward and rightward. The crank shaft 17 is accommodated in the crankcase 11.

In the present preferred embodiment, the crankcase 11, the cylinder block 12, the cylinder head 13, and the cylinder head cover 14 are separate parts and are fitted to each other. However, they may not be separate parts but may be integrated with each other as appropriate. For example, the crankcase 11 and the cylinder block 12 may be formed integrally with each other, or the cylinder block 12 and the cylinder head 13 may be formed integrally with each other. Alternatively, the cylinder head 13 and the cylinder head cover 14 may be formed integrally with each other.

The CVT 20 includes a first pulley 21, which is a driving pulley, a second pulley 22, which is a driven pulley, and a V-belt 23 wrapped around the first pulley 21 and the second pulley 22. A left end portion of the crankshaft 17 protrudes to the left from the crankcase 11. The first pulley 21 is fitted to the left end portion of the crankshaft 17. The second pulley 22 is fitted to a main shaft 24. The main shaft 24 is coupled to a rear wheel shaft 25 via a gear mechanism, which is not shown in the drawings. FIG. 2 depicts the state in which the transmission ratio for a front portion of the first pulley 21 and the transmission ratio for a rear portion of the first pulley 21 are different from each other. The second pulley 22 preferably has the same configuration. A transmission case 26 is provided on the left side of the crankcase 11. The CVT 20 is accommodated in the transmission case 26.

An alternator 27 is provided on a right side portion of the crankshaft 17. A fan 28 is secured to a right end portion of the crankshaft 17. The fan 28 rotates with the crankshaft 17. The fan 28 is arranged to suck air to the left by rotating. An air shroud 30 is disposed on the right side of the crankcase 11. The alternator 27 and the fan 28 are accommodated in the air shroud 30. The air shroud 30 and the fan 28 are one example of an air guide member that guides air mainly to the cylinder block 12 and the cylinder head 13. A suction port 31 is provided in the air shroud 30. The suction port 31 is positioned on the right side of the fan 28. As indicated by arrow A in FIG. 2, the air sucked by the fan 28 is introduced through the suction port 31 into the air shroud 30 and is supplied to, for example, the cylinder block 12 and the cylinder head 13.

Figure 3:
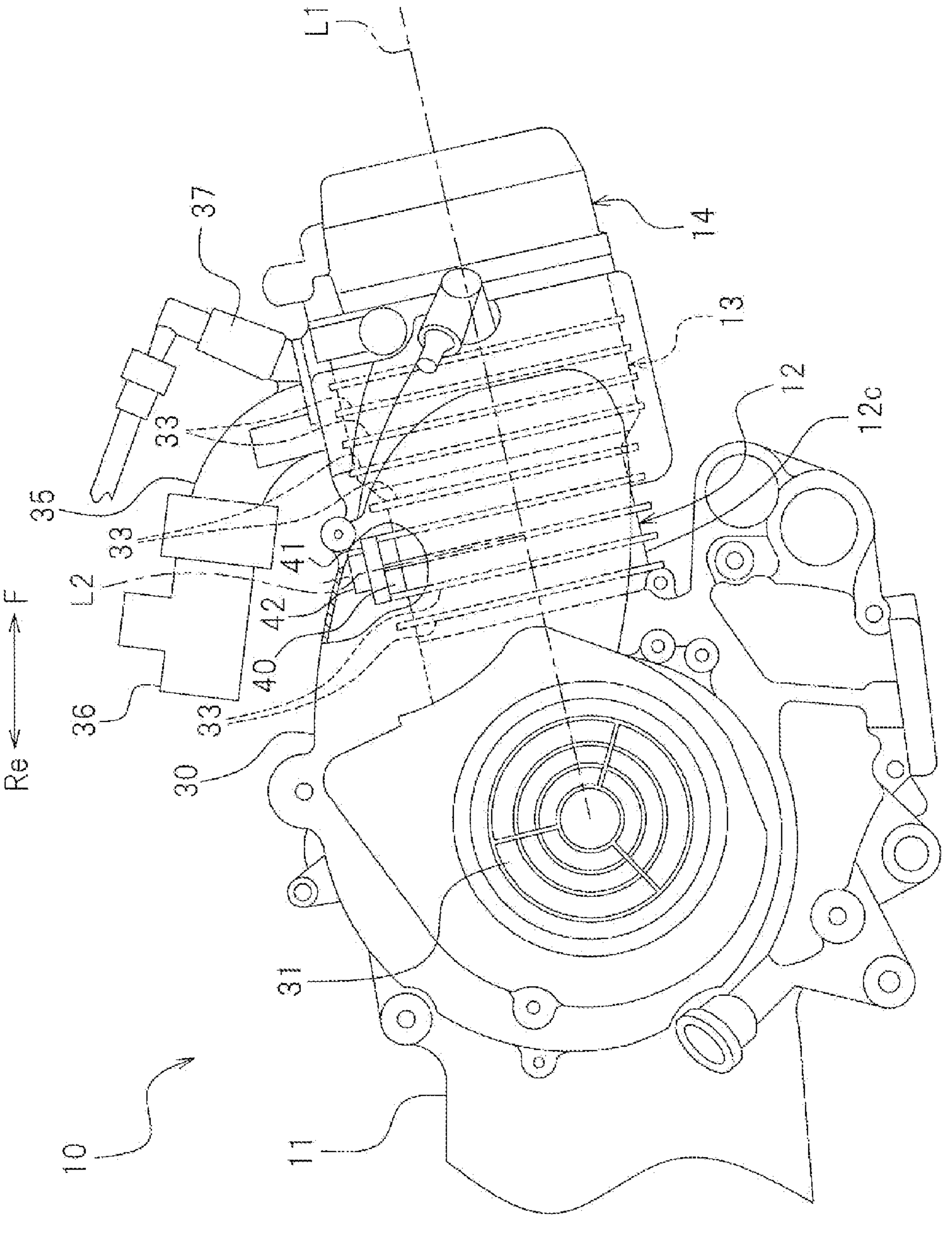
FIG. 3 is a right side view illustrating a portion of an engine according to the first preferred embodiment of the present invention.

FIG. 3 is a right side view illustrating a portion of the engine 10. As illustrated in FIG. 3, the air shroud 30 extends frontward along the cylinder block 12 and the cylinder head 13. The air shroud 30 covers right side portions of the cylinder block 12 and the cylinder head 13. In addition, the air shroud 30 partially covers upper and lower portions of the cylinder block 12 and the cylinder head 13.

As illustrated in FIG. 3, the engine 10 according to the present preferred embodiment is a type of engine in which the cylinder block 12 and the cylinder head 13 extend in a horizontal direction or in a direction inclined slightly upward with respect to a horizontal direction toward the front, that is, what is called a horizontally mounted type engine. Reference character L1 represents a line that passes through the center of the cylinder 15 (see FIG. 2, the line is hereinafter referred to as the "cylinder axis"). The cylinder axis L1 extends in a horizontal direction or in a direction slightly inclined from a horizontal direction. It should be noted, however, that the direction of the cylinder axis L1 is not particularly limited. For example, the inclination angle of the cylinder axis L1 with respect to the horizontal plane may be from, for example, 0° to 15°, or may be greater.

The engine 10 according to the present preferred embodiment is an air-cooled engine, the entire body of which is cooled by air. As illustrated in FIG. 2, a plurality of cooling fins 33 are provided on the cylinder block 12 and the cylinder head 13. However, the engine 10 may be an engine that includes the cooling fins 33 but also a portion of which is cooled by coolant. In other words, the engine 10 may be an engine a portion of which is cooled by air but another portion of which is cooled by coolant.

Although the specific shape of the fins 33 is not particularly limited, the fins 33 of the engine 10 according to the present preferred embodiment preferably have the following shape. The fins 33 according to the present preferred embodiment protrude from the surfaces of the cylinder block 12 and the cylinder head 13 and extend so as to be orthogonal or substantially orthogonal to the cylinder axis L1. In other words, the fins 33 extend in a direction orthogonal or substantially orthogonal to the surfaces of the cylinder block 12 and the cylinder head 13. The fins 33 are arrayed in a direction along the cylinder axis L1. Gaps are provided between adjacent fins 33. The gap between the fins 33 may be uniform or may not be uniform.

In the present preferred embodiment, the fins 33 that are provided on the cylinder block 12 are arranged over the top surface 12*a*, the right surface 12*b*, and the bottom surface 12*c* (see FIG. 3) of the cylinder block 12. The fins 33 that are provided on the cylinder head 13 are arranged over the top surface, the right surface, the bottom surface, and the left surface of the cylinder head 13. The fins 33, however, may be provided on at least a portion of the top surface, the right surface, the bottom surface, and the left surface of each of the cylinder block 12 and the cylinder head 13, and the position is not particularly limited. The fins 33 may be provided either only on the cylinder block 12 or only on the cylinder head 13.

The thicknesses of the plurality of fins 33 preferably are equal to each other. However, the fins 33 may have different thicknesses one from another. Each one of the fins 33 may have a uniform thickness irrespective of the location therein or may have different thicknesses from one location therein to another. In other words, the thickness of each of the fins 33 may be locally different.

In the present preferred embodiment, each of the fins 33 may preferably have a flat plate shape so that the surface of the fin 33 is a flat surface. However, the fin 33 may be curved, and the surface of the fin 33 may be a curved surface. In addition, the shape of the fin 33 is not limited to a flat plate shape, and the fin 33 may have various other shapes such as needle shapes and hemispherical shapes. When the fin 33 has a flat plate shape, the fin 33 does not need to extend in a direction orthogonal or substantially orthogonal to the cylinder axis L1 but may extend in a direction parallel or substantially parallel to the cylinder axis L1. Alternatively, the fin 33 may extend in a direction inclined with respect to the cylinder axis L1. The plurality of the fins 33 may extend either in the same direction or in different directions from each other.

As illustrated in FIG. 2, a sensor mounting boss 40 is preferably provided on the top surface 12*a* of the cylinder block 12. The boss 40 is preferably disposed above the cylinder block 12. In other words, the boss 40 is disposed above the engine body (that is, the portion of the engine 10 excluding the boss 40). As viewed in plan, the boss 40 is disposed at a position that overlaps with the engine body. As will be described below, an intake pipe 35 is connected to the top surface of the cylinder head 13. The boss 40 is provided on a surface of the cylinder block 12 that corresponds to the surface of the cylinder head 13 to which the intake pipe 35 is connected. It is also possible to provide the boss 40 on the cylinder head 13. The boss 40 may be provided on the top surface of the cylinder head 13, or may be provided on the surface of the cylinder head 13 to which the intake pipe 35 is connected.

In FIG. 2, reference numeral 19 is an intake port. Although not shown in the drawings, the intake port extends obliquely downward and rearward, forming a curve. As illustrated in FIG. 2, the right end of the boss 40 is positioned more to the right than the left end of the intake port 19, and the left end of the boss 40 is positioned more to the left than the right end of the intake port 19. That is, at least a portion of the boss 40 and at least a portion of the intake port 19 are disposed at an aligned position with respect to the left-right direction. In other words, at least a portion of the boss 40 and at least a portion of the intake port 19 are aligned, one in front and the other behind. Here, when viewed from a direction orthogonal to the cylinder axis L1, both the center of the boss 40 and the center of the intake port 19 are positioned on the cylinder axis L1. Thus, at least a portion of the boss 40 and at least a portion of the intake port 19 are at an aligned position with respect to the left-right direction so that a knock sensor 41 to be mounted to the boss 40 can be protected by the intake port 19 from a flying stone or the like from the front. In addition, the knock sensor 41 can be protected by the intake pipe 35 mounted to the intake port 19.

A chain case 99 is provided on a left side portion of the cylinder block 12. A cam chain is disposed inside the chain case 99. A mount portion 96 for mounting a cam chain tensioner 97 is provided on a portion of the chain case 99, that is, on a left side portion of the top surface 12*a* of the cylinder block 12. The cam chain tensioner 97 is inserted into a hole of the mount portion 96 so as to come into contact with the cam chain. The rear end of the boss 40 is positioned more to the rear than the front end of the cam chain tensioner 97, and the front end of the boss 40 is positioned more to the front than the rear end of the cam chain tensioner 97. That is, at least a portion of the boss 40 and at least a portion of the cam chain tensioner 97 are disposed at an aligned position with respect to the front-rear direction. In other words, at least a portion of the boss 40 and at least a portion of the cam chain tensioner 97 are lined up, one on the right and the other on the left. Thus, the knock sensor 41 mounted to the boss 40 can be protected by the mount portion 96 and the cam chain tensioner 97.

The boss 40 preferably has a tubular shape with a large wall thickness. The top surface of the boss 40 preferably has a flat surface. It should be noted, however, that the shape of the boss 40 is not particularly limited as long as the later-described knock sensor 41 can be mounted thereto. The boss 40 is continuous with some of the fins 33. In other words, the boss 40 is connected to some of the fins 33. More specifically, no gap is provided between the boss 40 and those fins 33. The boss 40 and those fins 33 are preferably integrally formed with each other.

Figure 5:
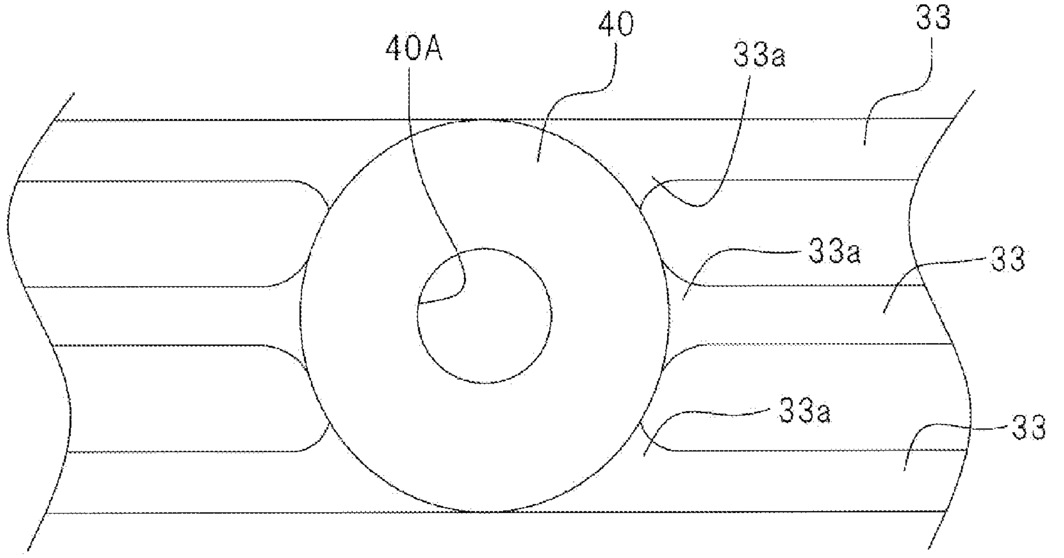
FIG. 5 is a view illustrating the boss and a portion of the fin viewed from an axial direction of the boss.

In the present preferred embodiment, the boss 40 is connected to three of the fins 33, for example. It should be noted, however, that the number of the fins 33 that are connected to the boss 40 is not limited to three. The boss 40 may be connected to either a plurality of the fins 33 or with only one of the fins 33. The thickness of each of the fins 33 may be constant, but each of the fins 33 may have a shape that is widened toward the boss 40, as illustrated in FIG. 5. For example, a portion 33*a* of each of the fins 33 that is connected to the boss 40 may have a larger cross-sectional area in contact with the boss 40 than portions of the fins 33 that are not connected to the boss 40. The portion 33*a* of each of the fins 33 that is connected to the boss 40 may have a shape whose width increases toward the boss 40.

As illustrated in FIG. 2, the boss 40 is arranged at a position overlapping the cylinder axis L1, as viewed in plan. The boss 40 is provided at a position such that an extension line L2 of the center of the boss 40 (see FIG. 3) intersects with the cylinder axis L1. The boss 40, however, may be arranged at a position such that the extension line L2 of the center of the boss 40 does not intersect with the cylinder axis L1. For example, the boss 40 may be arranged at a position that overlaps with an inner portion of the cylinder 15 but does not overlap with the cylinder axis L1, when viewed from a direction along the center of the boss 40. It is also possible to arrange the boss 40 at a position that does not overlap with an inner portion of the cylinder 15, when viewed from a direction along the center of the boss 40.

The front-rear position of the boss 40 is not particularly limited. In the present preferred embodiment, however, the center of the boss 40 (see reference character L2 in FIG. 2) is preferably positioned closer to the bottom dead center BDC than the midpoint MC between the top dead center TDC and the bottom dead center BDC of the piston. It is also possible to dispose the boss 40 further closer to the bottom dead center BDC. Conversely, it is also possible to dispose the boss 40 so as to be positioned closer to the top dead center TDC than the midpoint MC between the top dead center TDC and the bottom dead center BDC of the piston.

Figure 4:
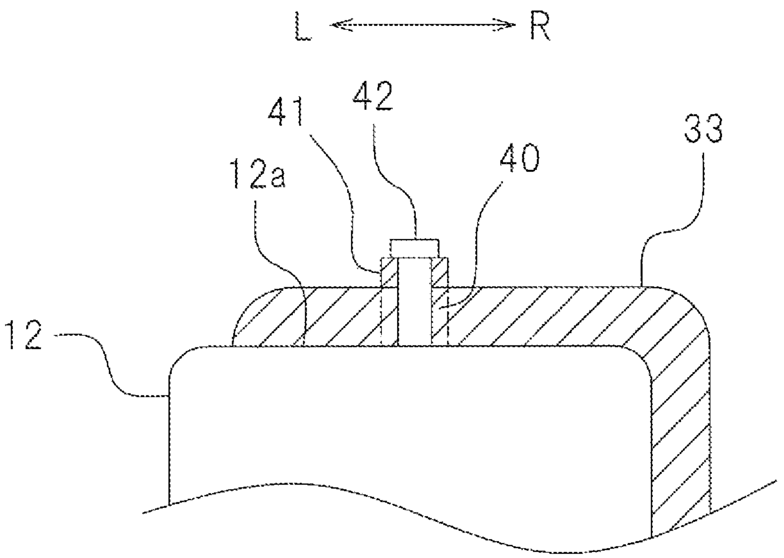
FIG. 4 is a cross-sectional view taken along line IV-IV in FIG. 2, illustrating a fin, a boss, etc.

As illustrated in FIG. 3, the height of the boss 40 may be the same as the height of the fins 33. Alternatively, the height of the boss 40 may be higher than the height of the fins 33. In other words, a portion of the boss 40 may protrude above the fins 33. Alternatively, the height of the boss 40 may be lower than the height of the fins 33. As illustrated in FIG. 4, the boss 40 extends in a direction orthogonal or substantially orthogonal to the top surface 12*a* of the cylinder block 12. Since the fins 33 protrude in a direction orthogonal or substantially orthogonal to the top surface 12*a* of the cylinder block 12, the direction in which the boss 40 protrudes and the direction in which the fins 33 protrude are parallel or substantially parallel to each other.

As illustrated in FIG. 3, the knock sensor 41 arranged to detect knocking is mounted on the boss 40. When knocking occurs, the combustion pressure abruptly changes, so specific vibration occurs in, for example, the cylinder block 12 and the cylinder head 13. As the knock sensor 41, it may be preferable to use, for example, a sensor that detects vibration and converts the vibration into an electric signal to output the signal (for example, a sensor equipped with a piezoelectric element). The type of the knock sensor 41 is, however, not particularly limited.

The shape of the knock sensor 41 is not particularly limited either. In the present preferred embodiment, however, the knock sensor 41 preferably has an annular shape having a flat top surface and a flat bottom surface. The knock sensor 41 is preferably mounted to the boss 40 by a bolt 42. As illustrated in FIG. 4, the knock sensor 41 can be fitted by placing the knock sensor 41 on the boss 40, inserting the bolt 42 through the knock sensor 41 and the boss 40, and thereafter tightening the bolt 42.

Figure 6:
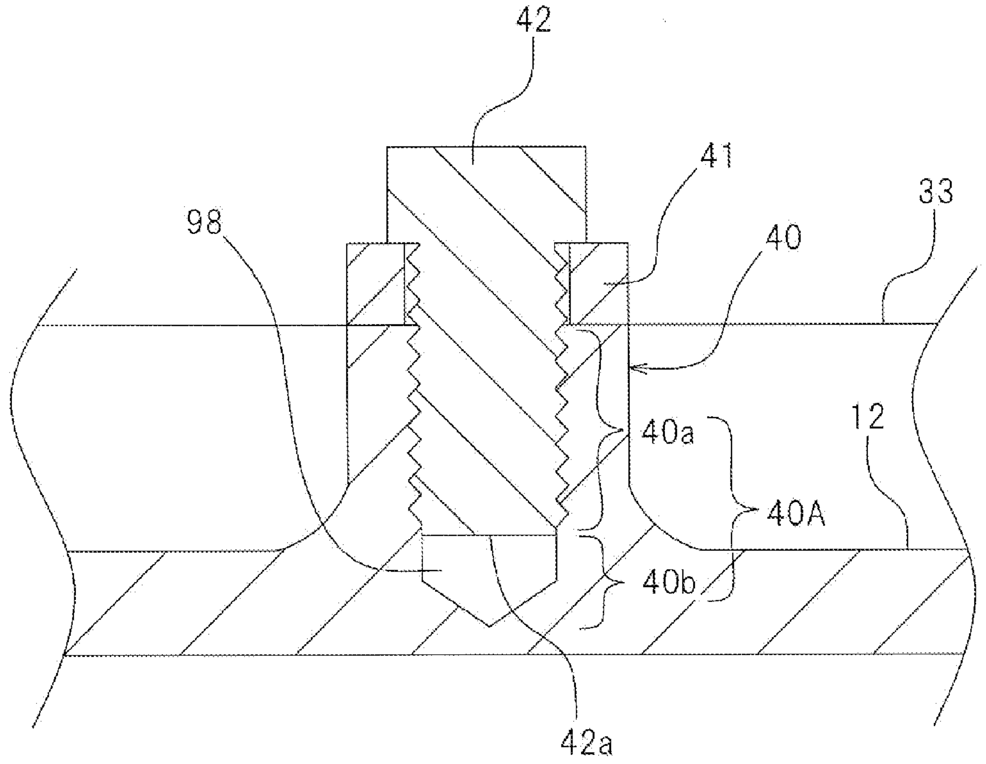
FIG. 6 is a cross-sectional view schematically illustrating a cross section of the boss, a sensor, and a bolt.

As schematically illustrated in FIG. 6, a hole portion 40A in which the bolt 42 is inserted is formed in the boss 40. The hole portion 40A has an internal thread portion 40*a* in which a helical groove is formed, and a non-threaded portion 40*b* in which no helical groove is formed. The inner circumferential surface of the non-threaded portion 40*b* has a flat smooth surface. The internal thread portion 40*a* is positioned closer to the surface than the non-threaded portion 40*b*. In other words, the non-threaded portion 40*b* is positioned more inward than the internal thread portion 40*a*. When the bolt 42 is inserted in the hole portion 40A and is rotated, the bolt 42 and the internal thread portion 40*a* are engaged with each other. Thereby, the bolt 42 is secured to the boss 40. As a result, the knock sensor 41 is secured to the boss 40 preferably by the bolt 42, for example.

Since the hole portion 40A has the non-threaded portion 40*b*, in which no helical groove is formed, a tip portion 42*a* of the bolt 42 does not reach the innermost portion of the hole portion 40A. A space 98 is formed between the tip portion 42*a* of the bolt 42 and the surface of the cylinder block 12. This space 98 provides a thermal insulation effect. The space 98 inhibits the transfer of heat from the cylinder block 12 to the bolt 42.

However, the method of securing the bolt 42 is not limited to the just-described method. Another possible method is as follows. A bolt 42 (which does not have a head but has only a shaft portion) is embedded in the boss 40 in advance, then the knock sensor 41 and a nut are fitted to the bolt 42 successively, and then, the nut is tightened.

As illustrated in FIG. 3, the intake pipe 35 is connected to the top surface of the cylinder head 13. A throttle body 36 that accommodates a throttle valve, which is not shown in the drawings, is connected to the intake pipe 35. When viewed from the side, the knock sensor 41 is disposed below the intake pipe 35 or the throttle body 36. A fuel injection valve 37 is disposed in front of the intake pipe 35. When viewed from the side, the knock sensor 41 is disposed on the opposite side of the intake pipe 35 (the left side of FIG. 3) to the side on which the fuel injection valve 37 is disposed (the right side of FIG. 3). Although not shown in the drawings, an exhaust pipe is connected to the bottom surface of the cylinder head 13.

As described previously, the combustion chamber is provided in the cylinder block 12 and the cylinder head 13. When knocking occurs in the combustion chamber, vibration resulting from the knocking propagates from the combustion chamber to the cylinder block 12, the cylinder head 13, and so forth. In the present preferred embodiment, the knock sensor 41 is preferably mounted to the cylinder block 12. The knock sensor 41 is disposed in the vicinity of the combustion chamber, in other words, in the vicinity of the location at which knocking occurs. As a result, it is possible to detect knocking with high accuracy by the knock sensor 41.

Although the vicinity of the combustion chamber is a location suitable for detection of knocking, it is a location in which the temperature is high. The temperature of the cylinder block 12 tends to be higher than that of the crankcase 11. For this reason, merely providing the knock sensor 41 on the cylinder block 12 can cause the knock sensor 41 to be heated by the cylinder block 12 with a high temperature, so there is a risk that the temperature of the knock sensor 41 may become too high. When the temperature of the knock sensor 41 becomes too high, the lifetime of the knock sensor 41 may be shortened.

The heat generated by combustion in the combustion chamber is conducted mainly from the cylinder block 12 via the boss 40 to the knock sensor 41. That is, the knock sensor 41 is heated mainly by heat conduction from the boss 40. However, in the engine 10 according to the present preferred embodiment, the boss 40 is continuous with some of the fins 33. The heat of the boss 40 does not remain in the boss 40 itself, but it is released vigorously through the fins 33. This means that the cooling capability of the boss 40 is high, preventing the temperature of the boss 40 from becoming excessively high. According to the present preferred embodiment, it is possible to inhibit the temperature increase of the knock sensor 41 because the knock sensor 41 is not easily heated by the boss 40.

Although the boss 40 may be connected to only one of the fins 33, the boss 40 in the present preferred embodiment is preferably connected to a plurality of the fins 33. For this reason, the boss 40 can be cooled more effectively, and the temperature increase of the knock sensor 41 can be suppressed further.

In the engine 10 according to the present preferred embodiment, air is supplied to, for example, the fins 33 of the cylinder block 12 by the fan 28 and the air shroud 30. For this reason, a sufficient amount of air can be supplied to, for example, the fins 33. As a result, the fins 33, for example, can be cooled more effectively, and the temperature increase of the knock sensor 41 can be suppressed sufficiently.

In association with running of the motorcycle 1, air is supplied from the front. It is also possible to cool, for example, the fins 33 by the airflow that occurs in association with running of the motorcycle 1, without using the fan 28 and the air shroud 30. However, such an air flow does not occur when the motorcycle 1 temporarily stops, that is, when idling. According to the present preferred embodiment, as long as the crankshaft 17 is rotating, air can be supplied by the fan 28. Even when idling, air can be supplied to, for example, the fins 33, so the temperature increase of the knock sensor 41 can be suppressed more effectively.

As illustrated in FIG. 4, the boss 40 extends in a direction orthogonal or substantially orthogonal to the top surface 12*a* of the cylinder block 12. The fin 33 positioned on the top surface 12*a* of the cylinder block 12 protrudes in a direction orthogonal or substantially orthogonal to the top surface 12*a*. Therefore, the direction in which the boss 40 protrudes is parallel or substantially parallel to the direction in which the fin 33 protrudes. Since the boss 40 is provided on the cylinder block 12 and is connected to the fin 33, the surface area of the fin 33 decreases corresponding to the area occupied by the bolt 42. However, according to the present preferred embodiment, since the direction in which the boss 40 protrudes and the direction in which the fin 33 protrudes are parallel or substantially parallel to each other, the decrease of the surface area of the fin 33 can be minimized. The boss 40 can be cooled more effectively because the decrease of the cooling capability of the fins 33 is inhibited. As a result, the temperature increase of the knock sensor 41 can be suppressed effectively. In addition, since the direction in which the boss 40 protrudes and the direction in which the fin 33 protrudes are parallel or substantially parallel to each other, the boss 40 can be cooled uniformly by the fin 33.

Since the direction in which the boss 40 protrudes and the direction in which the fin 33 protrudes are parallel or substantially parallel to each other, it is easier to manufacture the boss 40 that is integrated with the fin 33 than the case in which the direction in which the boss 40 protrudes is inclined from the direction in which the fin 33 protrudes. For example, when the boss 40 and the fins 33 are integrally formed by aluminum die casting, the hole-forming process for the boss 40 can be made easier.

As illustrated in FIG. 3, the knock sensor 41 is disposed at a higher position than the fins 33. The protruding amount of the knock sensor 41 from the top surface 12*a* of the cylinder block 12 is greater than the protruding amount of the fins 33 from the top surface 12*a* of the cylinder block 12. As a result, air hits the knock sensor 41 more easily. The knock sensor 41 itself can be cooled effectively by the supplied air. According to the present preferred embodiment, the heat conduction from the boss 40 to the knock sensor 41 can be suppressed, and at the same time, the knock sensor 41 itself can be cooled effectively. Therefore, the temperature increase of the knock sensor 41 can be suppressed further.

As illustrated in FIG. 3, the extension line L2 that passes through the center of the boss 40 and the cylinder axis L1 are orthogonal or substantially orthogonal to each other. Although the extension line L2 and the cylinder axis L1 may not necessarily intersect each other, the direction in which the boss 40 protrudes is parallel or substantially parallel to a virtual plane orthogonal or substantially orthogonal to the cylinder axis L1. Therefore, the boss 40 can be manufactured more easily than the case where the boss 40 protrudes in a direction inclined from a virtual plane orthogonal or substantially orthogonal to the cylinder axis L1.

While the motorcycle 1 is running, there are cases in which stone chips, dirt, and the like are kicked up from the ground. If such kicked-up stone chips and the like collide against the boss 40 or the knock sensor 41, the condition of mounting of the knock sensor 41 may worsen, or the knock sensor 41 may fail. According to the present preferred embodiment, however, a portion of the boss 40 or the knock sensor 41 is surrounded by the fins 33, as illustrated in FIG. 2. As a result, the boss 40 or the knock sensor 41 can be protected by the fins 33 from the kicked-up stone chips and the like. When the height of the fins 33 is higher than the height of the boss 40, the knock sensor 41 can be protected even more by the fins 33.

According to the present preferred embodiment, the boss 40 is provided on the top surface 12*a* of the cylinder block 12. The top surface 12*a* of the cylinder block 12 is less likely to be hit by the stone chips and the like that are kicked up from the ground than the left, right, and bottom surfaces thereof. Therefore, the boss 40 or the knock sensor 41 can be further inhibited from being hit by the stone chips and the like.

In the present preferred embodiment, the intake pipe 35 or the throttle body 36 is disposed above the knock sensor 41, as illustrated in FIG. 3. The intake pipe 35 and the throttle body 36 are components that have greater strength than the knock sensor 41. Even if an object falls from above, the knock sensor 41 can be protected by the intake pipe 35 or the throttle body 36.

According to the present preferred embodiment, as illustrated in FIG. 2, the boss 40 is disposed at such a position that the extension line L2 of the center of the boss 40 passes through the cylinder 15, particularly at such a position that the extension line L2 intersects the cylinder axis L1. This means that the knock sensor 41 is disposed at such a position that knocking can be detected more easily. Therefore, the present preferred embodiment can increase the detection accuracy of the knock sensor 41.

According to the present preferred embodiment, the boss 40 is provided on the cylinder block 12. The cylinder block 12 has a lower temperature than the cylinder head 13. The temperature of the boss 40 can be kept lower than the case where the boss 40 is provided on the cylinder head 13. As a result, the temperature increase of the knock sensor 41 can be suppressed further.

According to the present preferred embodiment, as illustrated in FIG. 5, the portion 33*a* of each of the fins 33 that is connected to the boss 40 has a larger cross-sectional area toward the boss 40 than portions of the fins 33 that are not connected to the boss 40. This enables the fins 33 to remove heat from the boss 40 more easily. As a result, the cooling efficiency of the boss 40 is improved, and the temperature increase of the knock sensor 41 can be suppressed desirably.

According to the present preferred embodiment, as illustrated in FIG. 6, the hole portion 40A of the boss 40 has the internal thread portion 40*a*, in which a helical groove is formed, and the non-threaded portion 40*b*, in which no helical groove is formed. When the sensor 41 is mounted, the space 98 is provided between the tip portion 42*a* of the bolt 42 and the cylinder block 12, so the heat conduction from the cylinder block 12 to the bolt 42 is suppressed. Thus, the sensor 41 can be inhibited from being heated by the cylinder block 12 through the bolt 42, and the temperature increase of the sensor 41 can be suppressed.

In the present preferred embodiment, air is supplied forcibly to the fins 33 and so forth by the fan 28. The fan 28 is, however, not always necessary. As described above, it is also possible to cool the fins 33 and so forth by the airflow from the front that occurs in association with running of the motorcycle 1.

In the present preferred embodiment, the fins 33 and so forth are preferably covered by the air shroud 30. The air shroud 30 is, however, not always necessary. The fins 33 and so forth may be exposed to the outside.

Second Preferred Embodiment

As illustrated in FIG. 2, in the engine 10 according to the first preferred embodiment, the boss 40 is preferably arranged at such a position that the extension line L2 of the center of the boss 40 intersects the cylinder axis L1. However, the position of the boss 40 is not particularly limited. In the second preferred embodiment, the position of the boss 40 is modified from that in the first preferred embodiment, as illustrated in FIG. 7.

Figure 7:
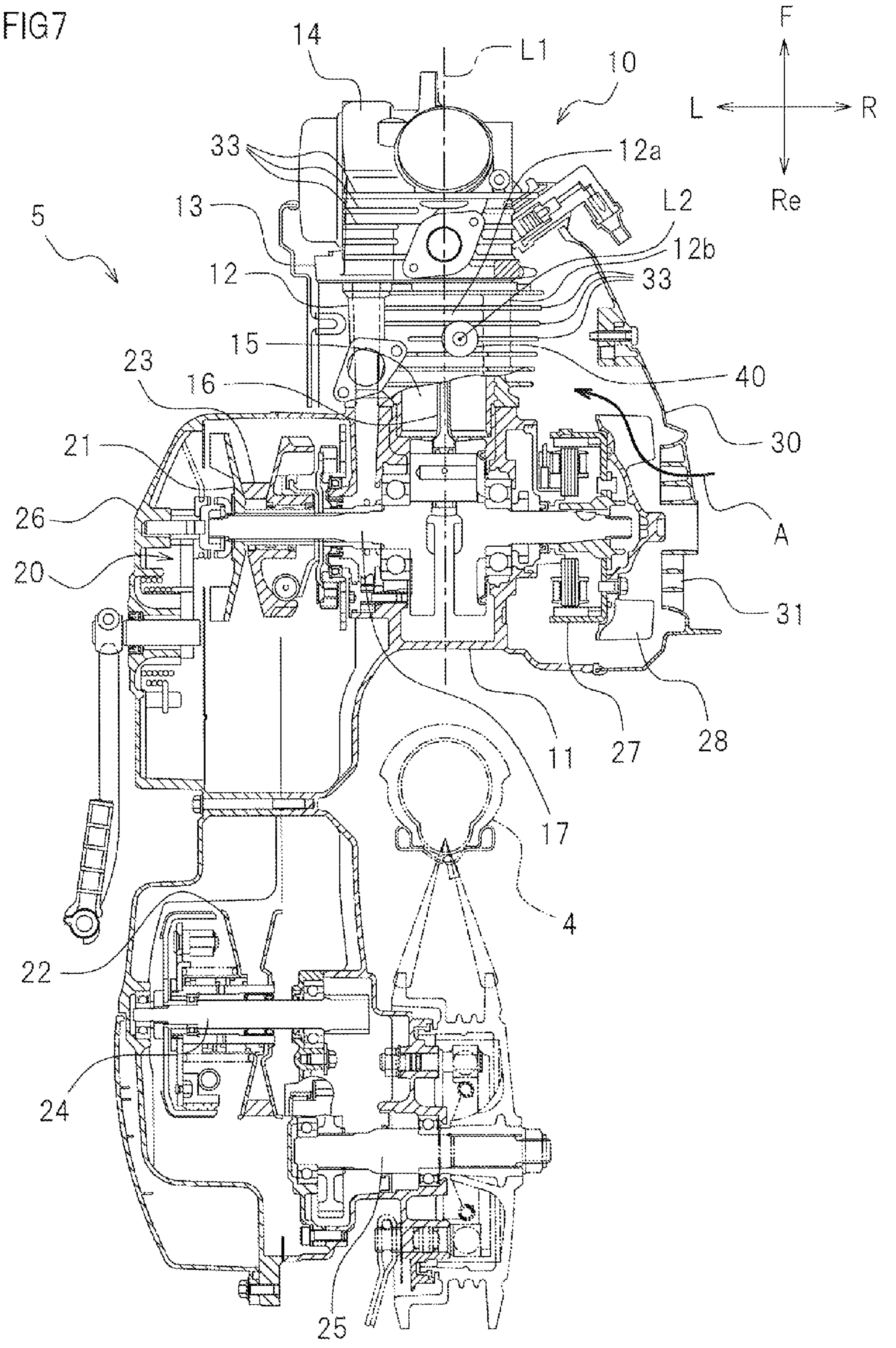
FIG. 7 is a cross-sectional view corresponding to FIG. 2 illustrating an engine unit according to a second preferred embodiment of the present invention.

As illustrated in FIG. 7, in the engine 10 according to the present preferred embodiment, the boss 40 is arranged rightward of the cylinder axis L1. It is also possible to allow the boss 40 to be arranged leftward of the cylinder axis L1.

The rest of the elements are preferably the same as in the first preferred embodiment other than the position of the boss 40. The rest of the elements are indicated by the same reference numerals as used in the first preferred embodiment and are not further elaborated upon.

The present preferred embodiment can obtain substantially the same advantageous effects as can be obtained by the first preferred embodiment. The air sucked from the suction port 31 of the air shroud 30 is supplied to the cylinder block 12 and the cylinder head 13. The air flows toward the front, and it also flows from the right to the left. At that time, the air cools the cylinder block 12 and the cylinder head 13, and consequently, the temperature of the air rises. According to the present preferred embodiment, air with a lower temperature is supplied to the boss 40 and the knock sensor 41 because the boss 40 is arranged rightward of the cylinder axis L1. As a result, the temperature increase of the knock sensor 41 can be suppressed even further.

As illustrated in FIG. 3, the intake pipe 35 and the throttle body 36 are disposed above the cylinder head 13. The intake pipe 35 and the throttle body 36 are disposed directly above the cylinder axis L1. For that reason, there may be cases in which the air flow stagnates in the region near the cylinder axis L1 that is above the top surface 12*a* of the cylinder block 12, due to the influence of the intake pipe 35 and the throttle body 36. In such cases, a sufficient flow of air can be supplied to the boss 40 and the knock sensor 41 by allowing the boss 40 to be spaced from the cylinder axis L1 as in the present preferred embodiment.

Third Preferred Embodiment

As illustrated in FIG. 4, in the engine 10 according to the first preferred embodiment, the boss 40 preferably protrudes in a direction parallel or substantially parallel to the direction in which the fins 33 protrude. However, the direction in which the boss 40 protrudes is not particularly limited. In the third preferred embodiment, the direction in which the boss 40 protrudes is modified from that in the first preferred embodiment, as illustrated in FIG. 8.

Figure 8:
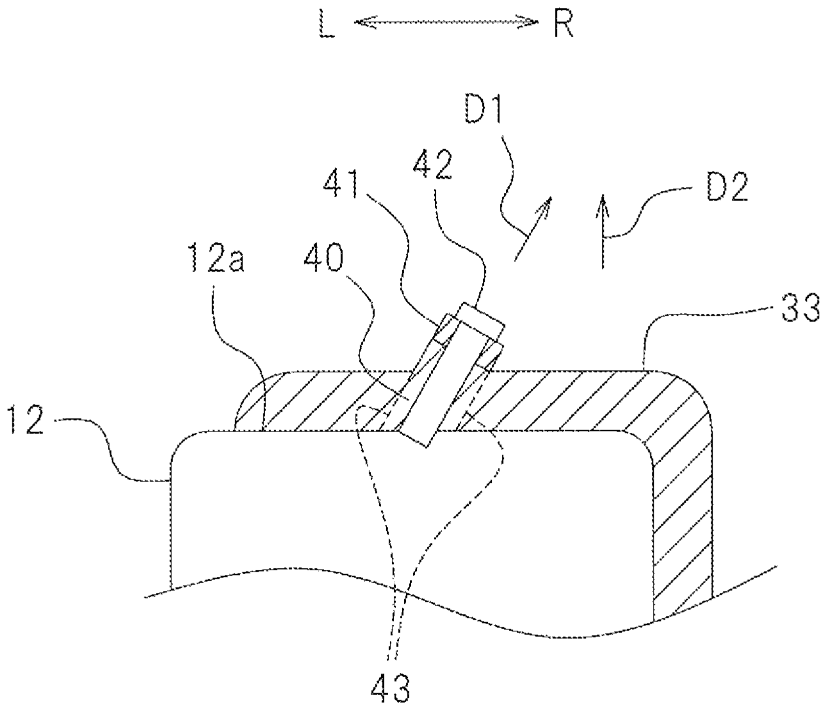
FIG. 8 is a cross-sectional view corresponding to FIG. 4 illustrating a fin, a boss, etc. according to a third preferred embodiment of the present invention.

As illustrated in FIG. 8, in the engine 10 according to the present preferred embodiment, the boss 40 protrudes in a direction D1 inclined with respect to a direction D2 in which the fins 33 protrude. The boss 40 extends in a direction inclined from the vertical direction. In the present preferred embodiment, the direction D1 in which the boss 40 protrudes is inclined obliquely rightward and frontward. However, it is possible that the direction D1 in which the boss 40 protrudes be inclined leftward and obliquely upward.

In the present preferred embodiment, the surface area of the fin 33 becomes smaller than that in the first preferred embodiment. Nevertheless, the portion where the boss 40 and the fin 33 are connected (the portion indicated by lines 43 in FIG. 8) becomes greater than that in the first preferred embodiment. Therefore, the amount of the heat conducted from the boss 40 to the fin 33 can be increased. According to the present preferred embodiment, a greater amount of heat can be conducted from the boss 40 to the fins 33. Moreover, heat can be conducted more quickly from the boss 40 to the fins 33.

Fourth Preferred Embodiment

Figure 9:
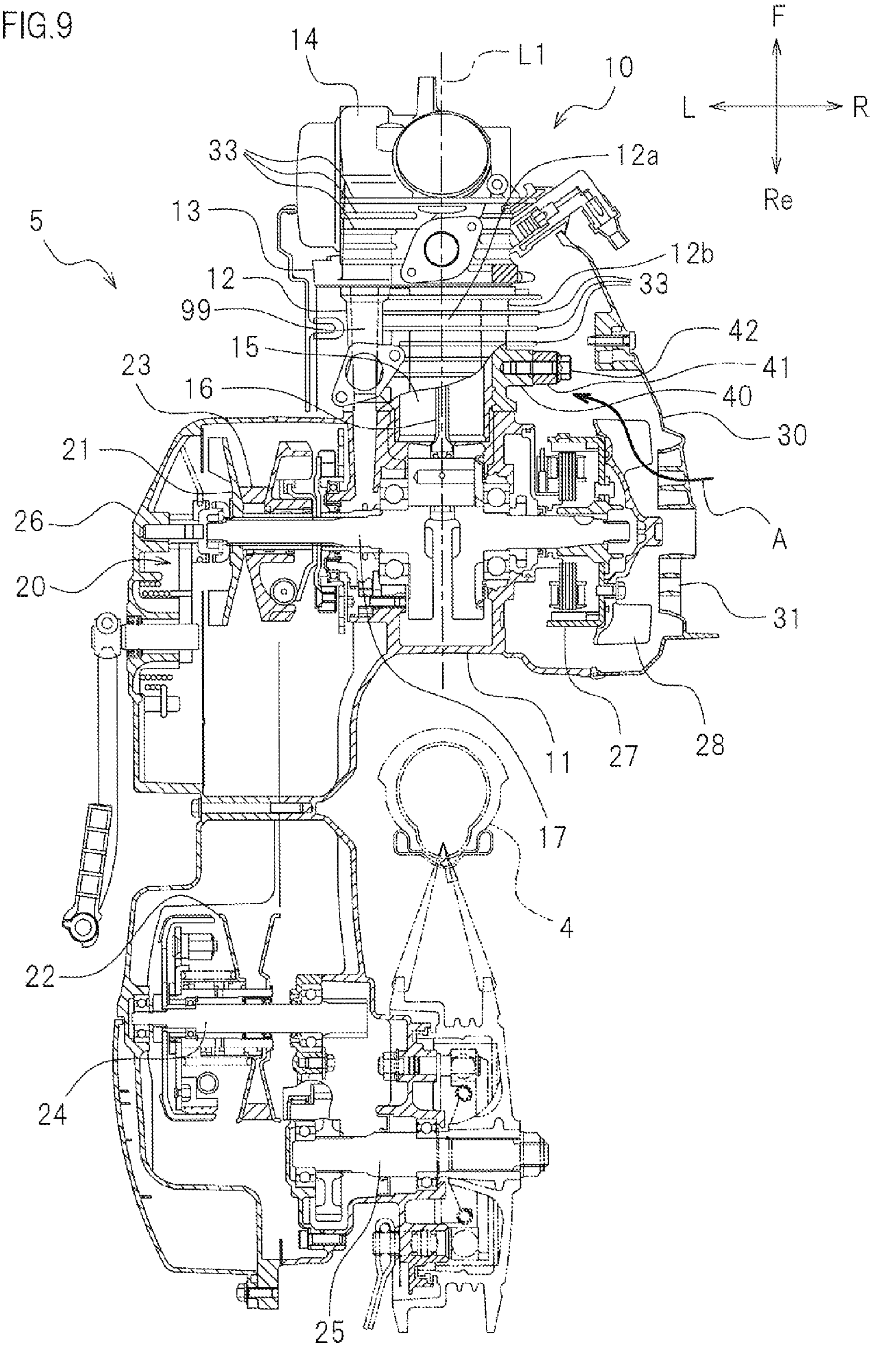
FIG. 9 is a cross-sectional view corresponding to FIG. 2 illustrating an engine unit according to a fourth preferred embodiment of the present invention.

As illustrated in FIG. 2, in the engine 10 according to the first preferred embodiment, the boss 40 is provided on the top surface 12*a* of the cylinder block 12. However, the position of the boss 40 is not particularly limited to the top surface 12*a* of the cylinder block 12. In the fourth preferred embodiment, the boss 40 is provided on the right surface 12*b* of the cylinder block 12, as illustrated in FIG. 9. The chain case 99 is provided to the left of the cylinder axis L1 of the cylinder block 12. The boss 40 is provided on a side of the cylinder block 12 that is opposite the chain case 99. In the following description, the same elements as in the first preferred embodiment are designated by the same reference numerals, and a further description thereof will be omitted.

In the present preferred embodiment as well, the air sucked from the intake port 31 of the air shroud 30 flows toward the front, and it also flows from the right to the left. The air with a relatively low temperature flows along the right surface 12*b* of the cylinder block 12. According to the present preferred embodiment, the air having an even lower temperature can be supplied to the boss 40 and the knock sensor 41. According to the present preferred embodiment, the cooling efficiency of the boss 40 and the knock sensor 41 can be increased, and the temperature increase of the knock sensor 41 can be suppressed even further.

During idling, in which the motorcycle 1 temporarily stops, the heat of the cylinder block 12 increases because of natural convection, and consequently, the top surface 12*a* of the cylinder block 12 tends to have a higher temperature than the left surface and the right surface 12*b*. The temperature increase of the knock sensor 41 during idling can be suppressed by providing the boss 40 on the right surface 12*b* of the cylinder block 12 as in the present preferred embodiment. In the present preferred embodiment, the boss 40 is preferably provided on the right surface 12*b* of the cylinder block 12. However, it is also possible to provide the boss 40 on the left surface of the cylinder block 12. The boss 40 may be provided on the same side as the side on which the chain case 99 is provided.

Fifth Preferred Embodiment

Figure 10:
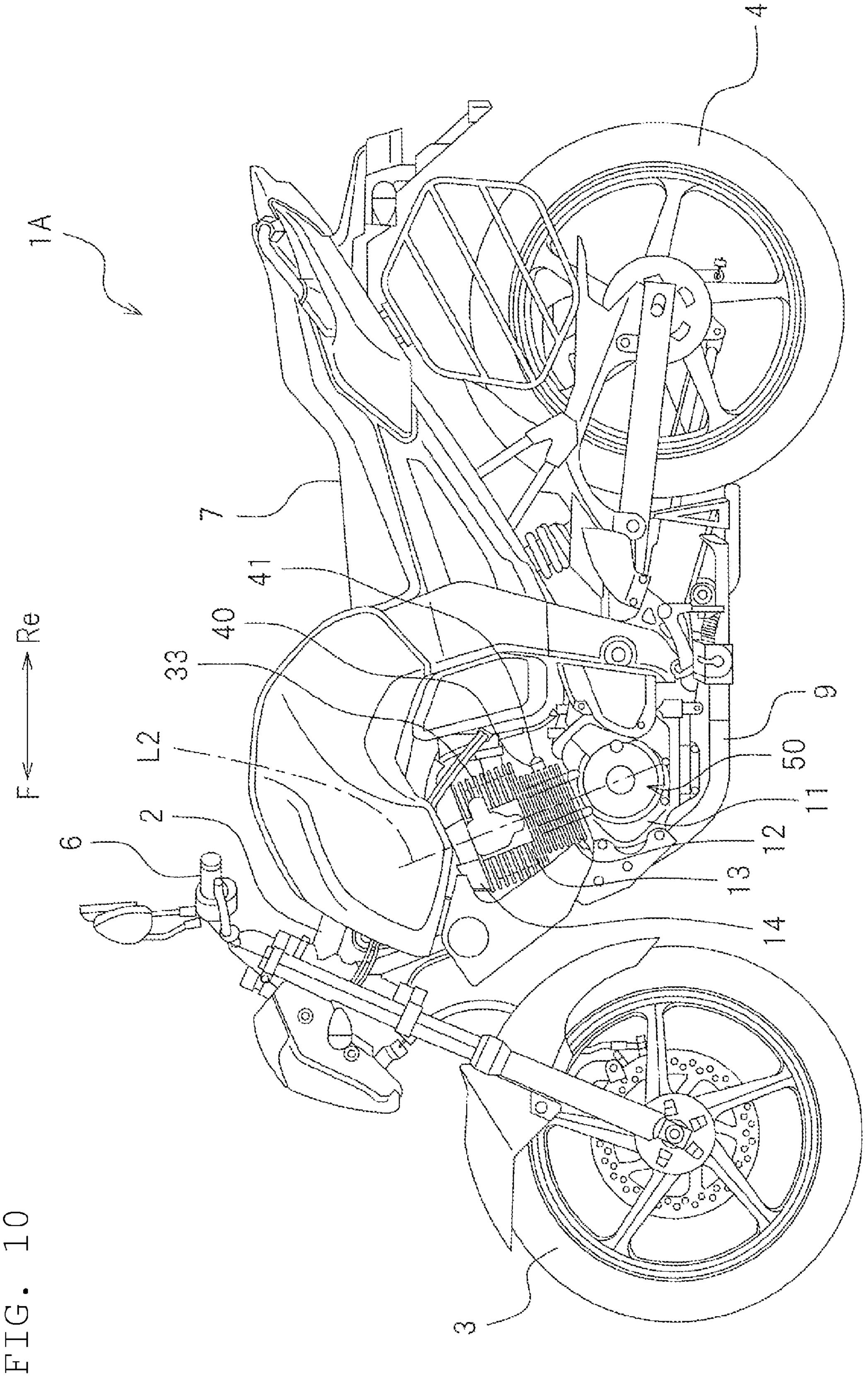
FIG. 10 is a left side view of a motorcycle according to a fifth preferred embodiment of the present invention.

The engine 10 in the foregoing preferred embodiments is a horizontally mounted type engine in which the cylinder axis L1 extends in a horizontal direction or in a substantially horizontal direction. However, the direction of the cylinder axis L1 is not limited to the horizontal direction or the substantially horizontal direction. As illustrated in FIG. 10, an engine 50 according to the fifth preferred embodiment is what is called a vertically mounted type engine, in which the cylinder axis L1 extends in a substantially vertical direction. The inclination angle of the cylinder axis L1 from a horizontal plane is, for example, about 45 degrees or greater.

The straddle-type vehicle according to the present preferred embodiment is what is called an on-road-type motorcycle 1A. The motorcycle 1A is equipped with a front wheel 3, a rear wheel 4, and a vehicle body 2 having a handlebar 6, a seat 7, and so forth. The rear wheel 4 is coupled to an engine 50 via a transmission chain (not shown) and is driven by the engine 50. In the present preferred embodiment, the engine 50 is fixed to the engine unit 9 but is non-swingably fixed to a body frame 9.

The engine 50 includes a crankcase 11, a cylinder block 12 extending frontward and obliquely upward from the crankcase 11, a cylinder head 13 connected to an upper portion of the cylinder block 12, and a cylinder head cover 14 connected to an upper portion of the cylinder head 13. In the present preferred embodiment as well, fins 33 are provided on the cylinder block 12 and the cylinder head 13. A boss 40 is preferably provided on the rear surface of the cylinder block 12, and a knock sensor 41 is mounted to the boss 40. The boss 40 preferably protrudes rearward and obliquely upward. The direction in which the boss 40 protrudes is parallel or substantially parallel to the protruding direction of the fins 33. The boss 40 is continuous with a plurality of the fins 33.

In the present preferred embodiment, as the motorcycle 1A runs, air flows from the front toward the rear of the engine 50. The cylinder block 12, the cylinder head 13, and so forth are cooled by the air flowing from the front.

In the present preferred embodiment as well, the cooling capability of the boss 40 can be improved because the boss 40 is continuous with the fins 33. The present preferred embodiment can also obtain substantially the same advantageous effects as can be obtained by the first preferred embodiment, such as suppressing the temperature increase of the knock sensor 41.

Other Modified Preferred Embodiments

In the foregoing preferred embodiments, the boss 40 for mounting the knock sensor 41 is preferably provided on the cylinder block 12. However, the boss 40 may be provided on the cylinder head 13 and connected to some of the fins 33 of the cylinder head 13. By providing the boss 40 on the cylinder head 13, the knock sensor 41 can be placed even closer to the location at which knocking occurs, and the knocking detection accuracy can be improved even further.

In the foregoing preferred embodiments, the engines 10 and 50 preferably are air-cooled engines. However, as described previously, an engine according to a preferred embodiment of the present invention can be an engine equipped with a fin, and also a portion thereof cooled by coolant. For example, it is possible that a water jacket may be provided in the cylinder head, and the cylinder head may be cooled by coolant. The fin or fins may be provided only on the cylinder block. In such a preferred embodiment as well, the above-described advantageous effects can be obtained by providing the boss to mount the knock sensor so as to be connected to the fin or fins.

In the foregoing preferred embodiments, the engines 10 and 50 preferably are four-stroke engines. However, the internal combustion engine according to a preferred embodiment of the present invention may be a two-stroke engine, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A single-cylinder internal combustion engine for a vehicle, the single-cylinder internal combustion engine comprising:

a cylinder block including a cylinder provided therein;

a cylinder head connected to the cylinder block;

one or more air-cooled cooling fins protruding from an outside surface of at least one of the cylinder block and the cylinder head;

a sensor mounting boss protruding from the outside surface of the at least one of the cylinder block and the cylinder head and being continuous with the one or more air-cooled cooling fins at the outside surface of the at least one of the cylinder block and the cylinder head such that no gap is provided between the sensor mounting boss and the one or more air-cooled cooling fins; and a sensor arranged to detect knocking of the single-cylinder internal combustion engine; wherein the sensor is mounted to the sensor mounting boss; and the sensor mounting boss and at least one of the one or more air-cooled cooling fins are integrally formed with each other.

2. The single-cylinder internal combustion engine according to claim 1, wherein the sensor mounting boss protrudes in a direction parallel or substantially parallel to a direction in which the one or more air-cooled cooling fins protrude.

3. The single-cylinder internal combustion engine according to claim 1, wherein the sensor mounting boss protrudes in a direction inclined with respect to a direction in which the one or more air-cooled cooling fins protrude.

4. The single-cylinder internal combustion engine according to claim 1, wherein the sensor mounting boss protrudes in a direction parallel or substantially parallel to a virtual plane orthogonal or substantially orthogonal to a cylinder axis.

5. The single-cylinder internal combustion engine according to claim 1, wherein a protruding amount of the sensor mounting boss from the outside surface is greater than a protruding amount of the one or more air-cooled cooling fins from the outside surface.

6. The single-cylinder internal combustion engine according to claim 1, wherein the one or more air-cooled cooling fins includes a plurality of the air-cooled cooling fins, and the plurality of air-cooled cooling fins surround at least a portion of the sensor mounting boss or the sensor.

7. The single-cylinder internal combustion engine according to claim 1, wherein:

each of the cylinder block and the cylinder head includes a top surface, a bottom surface, a left surface, and a right surface; and the sensor mounting boss is provided on the top surface of the cylinder block or the top surface of the cylinder head.

8. The single-cylinder internal combustion engine according to claim 1, wherein:

each of the cylinder block and the cylinder head includes a top surface, a bottom surface, a left surface, and a right surface; and the sensor mounting boss is provided on the left surface of the cylinder block, the right surface of the cylinder block, the left surface of the cylinder head, or the right surface of the cylinder head.

9. The single-cylinder internal combustion engine according to claim 1, wherein the sensor mounting boss is disposed at a position such that an extension line of a center of the sensor mounting boss passes through the cylinder.

10. The single-cylinder internal combustion engine according to claim 1, wherein the sensor mounting boss is disposed at such a position that an extension line of a center of the sensor mounting boss intersects a cylinder axis.

11. The single-cylinder internal combustion engine according to claim 1, wherein:

the one or more air-cooled cooling fins are provided at least on the outside surface of the cylinder block; and the sensor mounting boss is provided at least on the outside surface of the cylinder block.

12. The single-cylinder internal combustion engine according to claim 1, wherein:

the one or more air-cooled cooling fins include a plurality of air-cooled cooling fins; and the sensor mounting boss is connected to the plurality of air-cooled cooling fins.

13. The single-cylinder internal combustion engine according to claim 1, wherein a portion of the one or more air-cooled cooling fins that is connected to the sensor mounting boss has a larger cross-sectional area than portions of the one or more air-cooled cooling fins that are not connected to the sensor mounting boss.

14. The single-cylinder internal combustion engine according to claim 1, wherein:

the sensor mounting boss includes a hole portion in which a bolt arranged to secure the sensor to the sensor mounting boss is inserted; and the hole portion includes an internal thread portion in which a helical groove is formed, a non-threaded portion in which no helical groove is formed, and the non-threaded portion is positioned further inward than the internal thread portion.

15. A straddle-type vehicle comprising:

a single-cylinder internal combustion engine according to claim 1.

* * * * *